US009600177B2

(12) United States Patent
Iyer et al.

(10) Patent No.: US 9,600,177 B2
(45) Date of Patent: Mar. 21, 2017

(54) ELECTRONIC DEVICE WITH GESTURE DISPLAY CONTROL AND CORRESPONDING METHODS

(71) Applicant: Google Technology Holdings LLC, Mountain View, CA (US)

(72) Inventors: Boby Iyer, Elmhurst, IL (US); Craig J Detter, Gurnee, IL (US); John Hamilton O'Leary, River Forest, IL (US); Andre Luiz Silva Bazante, Chicago, IL (US); Dale F Zalewski, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/333,849

(22) Filed: Jul. 17, 2014

(65) Prior Publication Data

US 2016/0018980 A1 Jan. 21, 2016

(51) Int. Cl.
| | |
|---|---|
| *G06F 3/041* | (2006.01) |
| *G06F 3/0488* | (2013.01) |
| *G06F 3/0487* | (2013.01) |
| *G06F 1/16* | (2006.01) |
| *G06F 1/32* | (2006.01) |
| *G06F 3/01* | (2006.01) |

(52) U.S. Cl.
CPC ........ *G06F 3/04883* (2013.01); *G06F 1/1694* (2013.01); *G06F 1/3228* (2013.01); *G06F 3/017* (2013.01); *G06F 3/0416* (2013.01); *G06F 3/0487* (2013.01); *G06F 2200/1637* (2013.01); *G06F 2203/04808* (2013.01)

(58) Field of Classification Search
CPC ............... G06F 3/0488; G06F 3/04883; G06F 3/04808; G06F 3/0416
USPC .................................................. 345/156–184
See application file for complete search history.

(56) References Cited

U.S. PATENT DOCUMENTS

| | | | |
|---|---|---|---|
| 6,278,887 B1 | 8/2001 | Son et al. | |
| 7,606,603 B2 | 10/2009 | Brubacher-Cressman et al. | |
| 2011/0242043 A1* | 10/2011 | Yarvis | G06F 1/3215 345/174 |
| 2012/0154301 A1* | 6/2012 | Kang | G06F 3/04886 345/173 |
| 2013/0036377 A1* | 2/2013 | Colley | G06F 3/0488 715/764 |
| 2013/0097447 A1* | 4/2013 | Park | G06F 1/3246 713/323 |
| 2013/0106777 A1* | 5/2013 | Yilmaz | G06F 3/03545 345/174 |
| 2013/0316829 A1* | 11/2013 | Derome | A63F 9/24 463/37 |

* cited by examiner

*Primary Examiner* — Carolyn R Edwards
(74) *Attorney, Agent, or Firm* — Shumaker & Sieffert, P.A.

(57) ABSTRACT

An electronic device (100) includes a display (102). The electronic device can also include a user interface (110) to detect gesture input. One or more control circuits (116), operable with the display and the user interface, can detect a predefined gesture input (401) and alter a timer (122) controlling a duration in which the display is in an operational mode. This allows a user (300) to make a quick gesture to extend the time the display will be active without interaction so that the user can read long documents or other items without the display turning OFF.

14 Claims, 8 Drawing Sheets

ELECTRONIC DEVICE WITH GESTURE DISPLAY CONTROL AND CORRESPONDING METHODS

BACKGROUND

Technical Field

This disclosure relates generally to electronic devices, and more particularly to control systems and methods for electronic devices.

Background Art

Electronic devices, such as mobile telephones, smart phones, gaming devices, and the like, present information to users on a display. As these devices have become more sophisticated, so too have their displays and the information that can be presented on them. For example, not too long ago a mobile phone included a rudimentary light emitting diode display capable of only presenting numbers and letters configured as seven-segment characters. Today, high-resolution liquid crystal and other displays included with mobile communication devices and smart phones can be capable of presenting high-resolution video. Many of these displays are touch-sensitive displays. It would be advantageous to have improved methods of controlling such displays.

Figure 1:
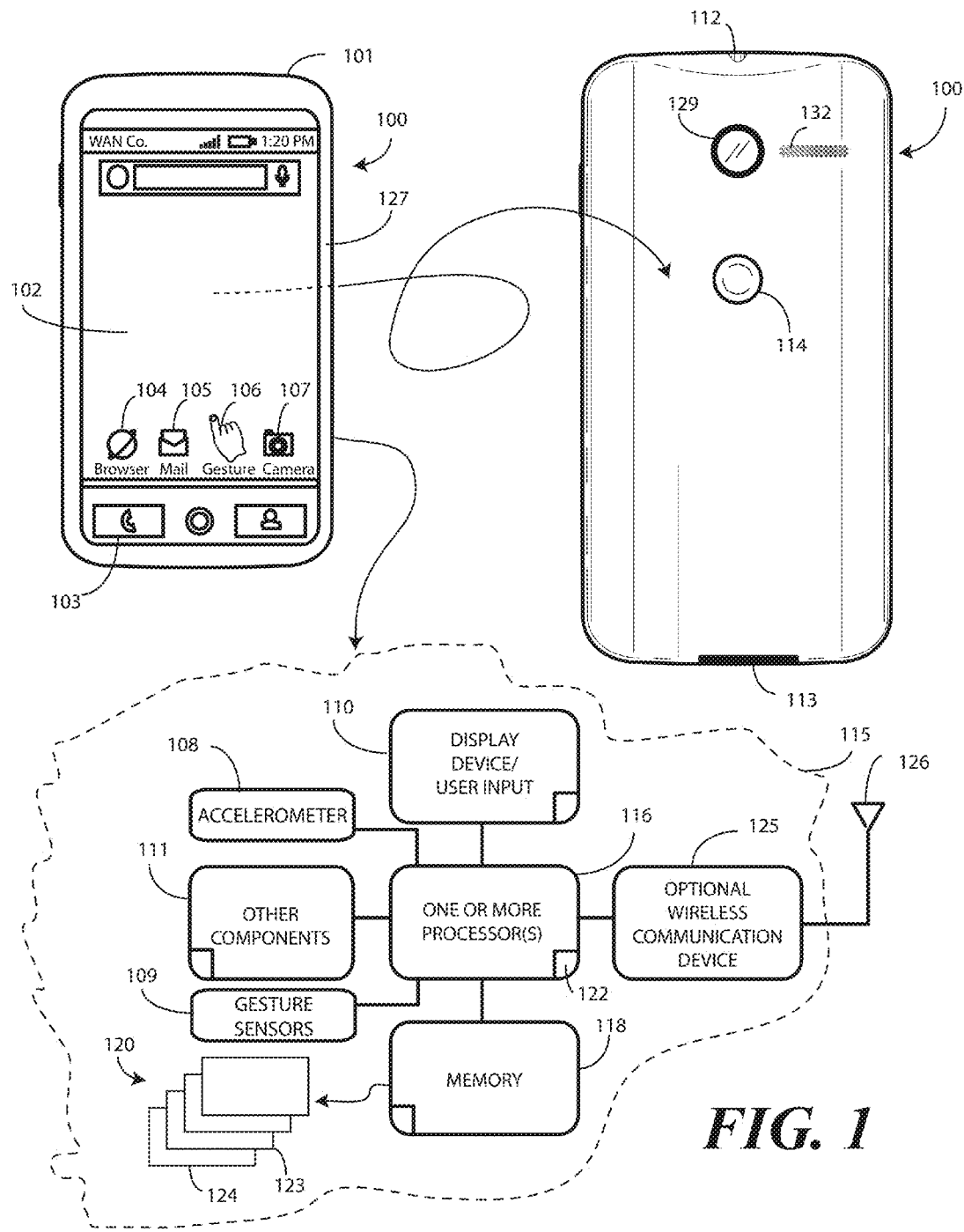
FIG. 1 illustrates an explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to controlling a timer that allows a display device to remain in an active mode of operation by determining one or more gestures. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more control circuits to implement, in conjunction with certain non-processor circuits, some, most, or all of the functions of gesture detection to determine how long a display device should remain in an active mode of operation as described herein. The non-processor circuits may include, but are not limited to, a radio receiver, a radio transmitter, signal drivers, clock circuits, power source circuits, gesture detectors, motion detectors, accelerometers, touch-sensitive displays, and other gesture receiving user input devices. As such, these functions may be interpreted as steps of a method to perform gesture detection to determine a duration in which a display device remains in an active mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a method in an electronic device to detect a predefined gesture to control a display. Embodiments of the disclosure contemplate that, while reading text on an electronic device such as a smartphone, or alternatively when using an application that does not require frequent user interaction, it can be annoying when a display "times out" and deactivates to save power. Illustrating by example, many portable electronic devices include timers that start when a display is placed into an active mode of operation. To conserve power, when the timer expires the display deactivates. This way, if a user inadvertently leaves a device in an operational mode, the battery will not become depleted due to extended operation. While such timers work well to conserve power, having to constantly interact with a display or user interface while reading a document that requires no other display interaction can be frustrating.

Embodiments of the disclosure provide a solution to this aggravating dilemma by configuring one or more control circuits operable with a user interface and/or display to detect a predetermined gesture to extend the duration for which the timer is set. For example, in one embodiment a user may employ a simple two-finger swipe gesture to alter the duration from, say, a few seconds to a few minutes. In another embodiment, detection of a simple two-finger swipe gesture can be used to temporarily double a default screen "timeout value." In one embodiment, at the end of this extended timeout, one or more control circuits operating in the electronic device can reset the duration to a default value. In one embodiment, the extended duration can be suspended if, for instance, a user affirmatively deactivates the display device.

As will be described in more detail below, predefined gesture inputs in accordance with embodiments of the disclosure can take any of a variety of forms. In a first embodiment, a predefined gesture can comprise touch input along a touch sensitive display or other touch sensitive surface. In another embodiment, the predefined gesture can comprise two-dimensional or three-dimensional gesture input in air near an electronic device. In yet another embodiment, the predefined gesture input can comprise motion of an electronic device itself, such as by an accelerometer or other motion sensor. In this last embodiment, a user can shake a device in a predefined manner to deliver gesture input to one or more control circuits of the device. Other forms of predefined gesture input will be obvious to those of ordinary skill in the art having the benefit of this disclosure.

In one embodiment, an electronic device comprises a display and a user interface. The display and user interface may be integrated together, such as when the display is a touch sensitive display. Alternatively, the display and user interface may be separate, such as when the display accompanies a touch sensitive surface or track pad.

In one embodiment, one or more control circuits are operable with the display and the user interface. The one or more control circuits can be configured to detect, with the user interface, a predefined gesture input. In response to detecting the predefined gesture input, the one or more control circuits can alter a timer controlling a duration in which the display is in an operational mode. Accordingly, where a display of the electronic device, or even the electronic device itself, may timeout after an X-second period, detection of the predefined gesture input may cause the device or display to timeout after a 2-X or 3-X or 10-X second period.

In one explanatory method, suitable for use on one or more control circuits or control circuits of an electronic device, embodiments of the disclosure can include activating either a display of an electronic device or the electronic device itself. In one embodiment, when this occurs, a method includes setting a timer defining a duration the display or device will be active. When a user interface detects a predefined gesture, the method can extend the duration, thereby allowing a user more time to use the device without continuous interaction.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a palm-top computer, a tablet computer, a gaming device, a media player, desktop computer, or other device.

This illustrative electronic device 100 includes a display 102, which may optionally be touch-sensitive. The display 102 can also be configured with a force sensor, such as a piezo-electric sensor or other force sensor. Where configured with both a touch sensor and force sensor, one or more processors of the electronic device 100, operable with the touch sensor and the force sensor, can determine not only where the user contacts the display 102, but also how much force the user employs in contacting the display 102.

In one embodiment where the display 102 is touch-sensitive, the display 102 can serve as a primary user interface 110 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

Where the display 102 is not touch sensitive, other user interface 110 components can be included with the electronic device 100. For example, in another embodiment, the user interface 110 comprises a touch-pad, a keypad, or other input and/or output device.

In one embodiment, the user interface 110 is operable to detect gesture input, motion input, or touch input. For example, the user interface 110 can include, or be operable with, one or more motion and other sensors 109 configured for detecting gesture input when the user is either touching the user interface 110, or alternatively when the user is making gestures while not "in contact" with the display 102 or user interface 110.

The explanatory electronic device 100 of FIG. 1 includes a housing 101. In one embodiment, the housing 101 includes two housing members. A front housing member 127 is disposed about the periphery of the display 102 and defines a front major face of the electronic device 100. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment. Other configurations will be obvious to those of ordinary skill in the art having the benefit of this disclosure.

A block diagram schematic 115 of the electronic device 100 is also shown in FIG. 1. In one embodiment, the electronic device 100 includes one or more control circuits 116. In one embodiment, the one or more control circuits 116 can include one or more processors, such as an application processor and, optionally, one or more auxiliary processors. One or both of the application processor or the auxiliary processor(s) can include one or more processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more control circuits 116 during operation.

The one or more control circuits 116, which may be any of one or more microprocessors, programmable logic, application specific integrated circuit device, or other similar device, is capable of executing program instructions and methods described herein. The program instructions and methods may be stored either on-board in the one or more control circuits 116, or in the memory 118, or in other computer readable media coupled to the one or more control circuits 116. The one or more control circuits 116 can be configured to operate the various functions of the electronic device 100, and also to execute software or firmware applications and modules that can be stored in a computer readable medium, such as the memory 118. In one embodiment, the one or more control circuits 116 execute this software or firmware, in part, to provide device functionality. The memory 118 may include either or both static and dynamic memory components, may be used for storing both embedded code and user data.

In this illustrative embodiment, the electronic device 100 also includes an optional communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more control circuits 116 can be responsible for performing the primary functions of the electronic device 100. Executable software code used by the one or more control circuits 116 can be configured as one or more modules 120 that are operable with the one or more control circuits 116. Such modules 120 can store instructions, control algorithms, and so forth.

In one embodiment, the one or more control circuits 116 are responsible for running an operating system environment 121 of the electronic device 100. The operating system environment 121 can include a kernel, one or more drivers, and an application service layer 123, and an application layer 124. The operating system environment 121 can be configured as executable code operating on one or more control circuits 116 of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a gesture recognition application 106 configured to permit the one or more control circuits 116 of the electronic device 100 to detect one or more predefined gesture inputs delivered by a user, and a camera application 107 configured to capture still (and optionally video) images. These applications are illustrative only, as others will be obvious to one of ordinary skill in the art having the benefit of this disclosure.

In one or more embodiments, in addition to the touch sensitive input functions optionally offered by the display 102, the electronic device 100 can be equipped with additional motion and other sensors 109. Additionally, in one embodiment, an accelerometer 108 is disposed within the electronic device and is operable with the one or more control circuits 116 to detect movement of the electronic device 100. The additional motion and other sensors 109 and the accelerometer 108 can each be used as a gesture detection device. Illustrating by example, in one embodiment a user can deliver gesture input by moving a hand or arm in predefined motions in close proximity to the electronic device 100. In another embodiment, the user can deliver gesture input by touching the display 102. In yet another embodiment, a user can deliver gesture input by shaking or otherwise deliberately moving the electronic device 100. Other modes of delivering gesture input will be obvious to those of ordinary skill in the art having the benefit of this disclosure.

When the display 102 is configured with a touch sensor, such as a capacitive sensor having transparent electrodes disposed across the surface of the display 102, gesture input can be delivered to the electronic device 100 by making gestures while touching the display 102 with a finger or stylus. For instance, in some embodiments a single swiping action, such as a single-finger swipe gesture, two-finger swipe gesture, or other swiping gesture, across the surface of the display 102 can be used to control functions of the electronic device. Accordingly, the one or more control circuits 116 can be configured to detect these and other gestures via the display 102 and/or user interface 110 in one or more embodiments. Further, in one or more embodiments, the one or more control circuits 116 can be configured to detect a predetermined characteristic of the gesture input. Examples of predetermined characteristics of gesture input comprise one or more of gesture duration, gesture intensity, gesture proximity, gesture accuracy, gesture contact force, or combinations thereof. Other examples will be obvious to those of ordinary skill in the art having the benefit of this disclosure.

In some embodiments, the gesture input can be "open-air gesture input." This means that the user is not in contact with the electronic device 100, but is rather making two or three-dimensional gestures in the open air near the electronic device. Accordingly, the user interface 110 can be configured to detect such predefined gesture input. For example, in one embodiment the user interface 110 can comprise an infrared detector. Open-air gesture input may be detected from reflections of infrared signals from a user while the user is making gestures in close proximity to the user interface 110. In another embodiment, the user interface 110 comprises an imaging device such as a camera. In such an embodiment, open-air gesture input may be detected by capturing successive images of a user making a gesture in close proximity to the user interface 110.

In yet another embodiment, open-air gesture input is detected by light. The user interface 110 can include a light sensor configured to detect changes in optical intensity, color, light, or shadow in the near vicinity of the user interface 110. The light sensor can compare successive readings of luminous intensity, color, or other spatial variations between images to detect motion or the presence of an object near the user interface 110.

In still another embodiment, the user interface 110 is to detect the presence of nearby objects before those objects contact the electronic device 100. Illustrating by example, the user interface 110 can include one or more proximity sensors to emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor. Where included, each proximity sensor component can be one of various types of proximity sensors, such as but not limited to, capacitive, magnetic, inductive, optical/photoelectric, laser, acoustic/sonic, radar-based, Doppler-based, thermal, and radiation-based proximity sensors.

In one embodiment, an accelerometer 108 can be included to detect motion of the electronic device 100. The accelerometer 108 can also be used to determine the spatial orientation of the electronic device 100 in three-dimensional space by detecting a gravitational direction. In addition to, or instead of, the accelerometer 108, an electronic compass can be included to detect the spatial orientation of the electronic device relative to the earth's magnetic field. Either of these devices can be used to detect gesture input via motion of the electronic device 100. Similarly, the motion or other sensors 109 can include one or more gyroscopes to detect rotational motion of the electronic device. The gyroscope can be used to determine the spatial rotation of the electronic device in three-dimensional space. Each of these can be used to detect gesture input.

As noted above, in one or more embodiments the one or more control circuits 116 are configured to detect not only gesture input, but also a predetermined characteristic of a gesture input. Examples of such characteristics include gesture duration, gesture intensity, gesture proximity, gesture accuracy, gesture contact force, or combinations thereof. Where the one or more control circuits 116 detect such a predetermined characteristic, it can be used to control one or more functions of the electronic device 100 such as actuating or deactuating the display 102, or alternatively setting, resetting, or adjusting a timer. For example, where the predetermined characteristic is gesture duration, the one or more control circuits 116 can be configured to alter a timer controlling a duration in which the display 102 is in an operational mode in response to detecting the gesture duration. In one embodiment, in which the one or more control circuits 116 are to increase the duration, this increase can be based upon the detected gesture duration. Thus, when a user makes a gesture having a longer duration, the duration during which the display 102 is in the active or operational mode may be adjusted longer than when the user makes a shorter gesture. A one second gesture may cause the display 102 to stay active for one minute, while a three second gesture may cause the display 102 to stay active for three minutes, and so forth. Where the duration of the gesture is longer, the duration in which the display 102 is active can be longer as well, corresponding to the gesture duration.

Similarly, where the predetermined characteristic is gesture intensity, the one or more control circuits 116 can keep the display 102 in the operational mode for a duration that is a function of gesture intensity. For example, a "harder" gesture input may keep the display 102 in an active mode of operation longer than a "softer" gesture.

Where the user interface 110 is configured to detect gesture proximity, the one or more control circuits 116 can keep the display 102 in an active mode of operation as a function of gesture proximity. For example, a gesture input occurring closer to the user interface 110 may keep the display 102 in an active mode of operation longer than a gesture input farther away from the user interface 110, and so forth. These examples are explanatory only, as others will be obvious to those of ordinary skill in the art having the benefit of this disclosure.

The electronic device 100 can include other components 111. The other components 111 may include a video input component such as an optical sensor, another audio input component such as a microphone, and a mechanical input component such as button or key selection sensors, touch pad sensor, touch screen sensor, capacitive sensor, motion sensor, and switch. Similarly, the other components 111 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms. The other components 111 of the electronic device 100 can also include a device interface to provide a direct connection to auxiliary components or accessories for additional or enhanced functionality and a power source, such as a portable battery, for providing power to the other internal components and allow portability of the electronic device 100.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

As noted above, in one embodiment, the one or more control circuits 116 can detect, with the user interface 110, a predefined gesture input. Once this occurs, the one or more control circuits 116 can alter a timer 122 controlling a duration in which the display is in an operational mode.

Optionally, this altering can occur in response to detecting the predefined gesture input. Illustrating by example, where the display 102 of the electronic device 100, or even the electronic device 100 itself, may timeout after an X-second period, detection of the predefined gesture input may cause the electronic device 100 or display 102 to timeout after a 2-X or 3-X or 10-X second period instead. In other embodiments, the one or more control circuits 116 of the electronic device 100 may be configured to alter the timer 122, in response to a singe predefined gesture input, such as a two-finger touch or swipe, to cause the display 102 to remain in the operational mode until a user deactivation of the display 102 or the electronic device 100 occurs. This embodiment allows the user to make a single predefined gesture input that causes the display 102 to remain in the operational mode until the user turns either the electronic device 100 or the display 102 off. Advantageously, embodiments of the disclosure while solve the aggravation of reading text on the display 102 and having the display 102 or the electronic device 100 time out by allowing the user to make a simple gesture to override the time out timer.

Figure 2:
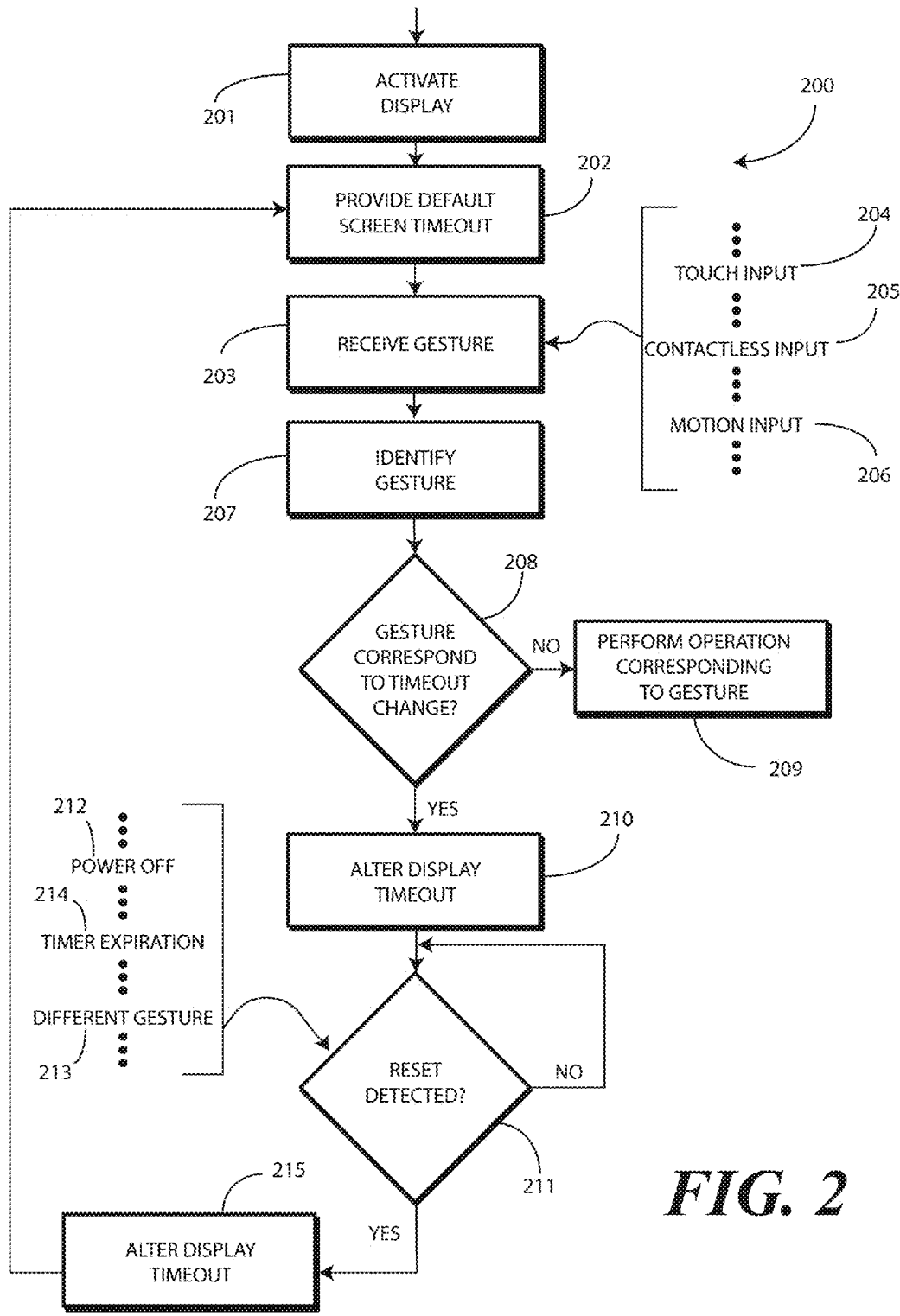
FIG. 2 illustrates an explanatory method in accordance with one or more embodiments of the disclosure.

Turning now to FIG. 2, illustrated therein is one explanatory method 200 by which this advantage can be achieved.

At step 201, the display (102) of an electronic device (100) is activated. For example, a user may turn ON the electronic device (100) to read email, a book, a document, a website, or other information. In one embodiment, this step 201 also includes the initiation of a timer (122). The timer (122) is initiated, in one embodiment, when the display (102) is placed into an active mode of operation. To conserve power, when the timer (122) expires, either the electronic device (100) or the display (102) can deactivate, and alternatively be placed in a low power or sleep mode of operation. This way, if a user inadvertently leaves a device in an operational mode, its battery will not become depleted due to extended operation.

At step 202, the method 200 sets the timer (122) to define a duration the display (102) will be active. In one embodiment, step 202 includes retrieving a predefined default value for the timer (122) from the memory (118). Illustrating by example, a user may control the general settings of the electronic device (100) to provide a user setting that the display (102) and/or electronic device (100) should time out after, say, thirty seconds without an affirmative interaction from the user. Alternatively, the predefined default value could be set by the manufacturer in the factory. In a normal mode of operation, the timer (122) can be reset in accordance with this predetermined default value each time a user interaction occurs. Thus, each time a user interacts with the electronic device (100), it will be at least thirty seconds before the display (102) and/or the electronic device (100) times out.

Embodiments of the disclosure contemplate, however, that when reading a long document, book, or other content offering, a user may desire to simply read without having to continually interact with the electronic device (100) to keep the display (102) and/or the electronic device (100) itself from timing out and entering a low power, inactive, or sleep mode of operation. Accordingly, in one embodiment, at step 202, the method 200 detects, with a user interface (110) a predefined gesture or predefined gesture input. Examples of predefined gesture inputs include touch inputs 204, such as a two-finger swipe gesture that may be received along a surface of a display (102). Other examples of predefined gesture inputs include "contactless" or open-air inputs 205 detected by a user interface (110), such as waving a hand near the electronic device, optionally in a predefined gesture motion or with a predefined gesture characteristic such as gesture duration, gesture intensity, gesture proximity, or combinations thereof. Still other examples of predefined gesture inputs include motion inputs 206, such as movement of the electronic device (100) from shaking the electronic device (100) as detected by a motion detector or other sensor like an accelerometer (108). Some of these examples will be explained in more detail with reference to FIGS. 3-9. Still other examples will be obvious to those of ordinary skill in the art having the benefit of this disclosure.

At step 207, the method 200 identifies the gesture input. Some gestures may correspond to general operation of the device. For example, a single-finger swipe may correspond to a scrolling operation, while a two-finger swipe corresponds to increasing the duration during which the display (102) or electronic device (100) is in the active mode of operation. Filtering display controlling gestures and general operation gestures can occur at decision 208. General operations can be performed at step 209.

At step 210, after determining that a predefined gesture input is to alter the timer (122) controlling the duration in which the display (102) or the electronic device (100) is in the operational mode, the method 200 alters the duration at step 210. In one embodiment, the altering of step 210 includes either extending or increasing the duration. For example, in one embodiment the extending occurring at step 210 includes at least doubling the duration. In other embodiments, where the display (102), or even the electronic device (100) itself, may timeout after an X-second period, step 210 may cause the electronic device (100) or display (102) to timeout after a 2-X or 3-X or 10-X second period.

In one embodiment, steps 203-210 can be repeated. Accordingly, the method can detect another predefined gesture input at step 203, and can again extend the duration at step 210. For example, where the timer (122) would ordinarily be reset by an X-second period in normal operation, repeating steps 203-210 may instead reset the timer (122) to the 2-X, 3-X, or 10-X second period upon detecting another predefined gesture input at step 203, such as a two-finger touch or swipe.

At decision 211, the method 200 determines whether a reset has been received. Resets can include user resets or automatic resets. In one embodiment, a user reset includes powering OFF 212 the display (102) or electronic device (100). In another embodiment, the user delivers a different predefined gesture 213 to override the altering of step 210. In another embodiment, an automatic reset includes expiration 214 of the timer (122).

Where a reset occurs, the method 200 can perform a subsequent action at step 215. For example, in one embodiment the method 200 deactivates the display (102) at step 215 upon expiration 214 of the timer (122). This deactivation can occur, in one embodiment, upon one or more of expiration 214 of the timer (122), detecting a different predefined gesture 213, or detecting user deactivation of the display (102). In another embodiment, the method 200 causes the display (102), or alternatively the electronic device itself (200) to enter a low power or sleep mode at step 215 upon expiration 214 of the timer (122). In another embodiment, the method 200 resets the duration to a predefined default value at step 215 in response to the expiration 214 of the timer (122).

Figure 3:
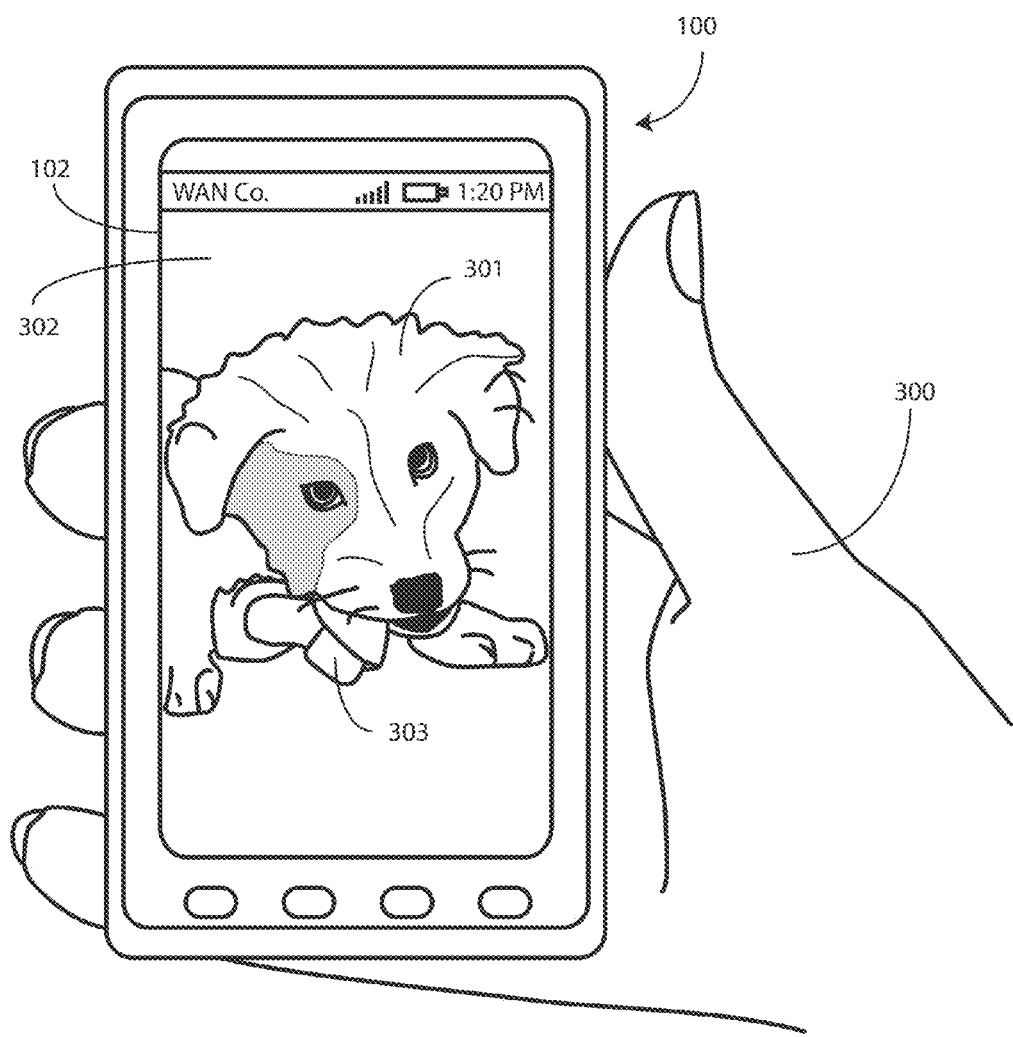
FIG. 3 illustrates one or more explanatory method steps in accordance with one or more embodiments of the disclosure.

Turning now to FIGS. 3-9, a few examples of systems and methods describe above will be shown. Turning first to FIG. 3, a user 300 is holding an electronic device 100. She is looking at a picture of her puppy 301, whose name is Buster. A picture 302 of Buster as a puppy chewing on a bone 303 is being presented on the display 102. She enjoys looking at Buster for hours at a time. However, she gets frustrated when the display 102 times out to save power or otherwise conserve resources.

Figure 4:
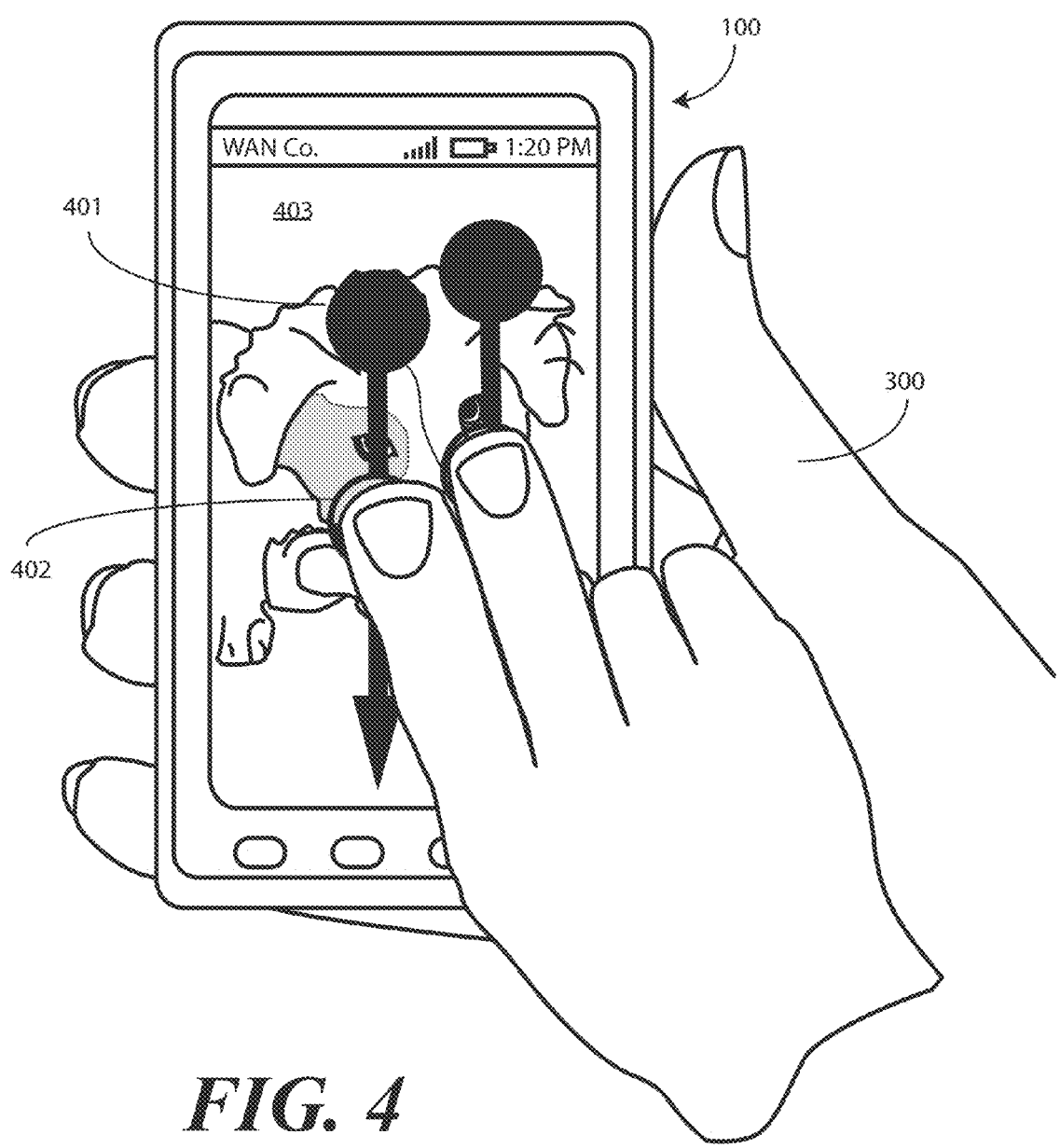
FIG. 4 illustrates one or more explanatory method steps in accordance with one or more embodiments of the disclosure.

Turning now to FIG. 4, the user 300 delivers a predefined gesture input 401 to the electronic device 100. In this example, the predefined gesture input 401 comprises a touch input received along a surface 403 of the display 102. This particular touch input is a two-finger swipe gesture 402, and more particularly a vertical two-finger swipe gesture. Embodiments of the disclosure contemplate that the user 300 may use, for example, a single finger swipe gesture to scroll along the picture of Buster, to change its magnification, or alternatively to select another picture of Buster. At the same time, the two-finger swipe gesture 402 offers a convenient gesture that is readily identifiable by one or more control circuits (116) of the electronic device 100. Accordingly, the one or more control circuits (116) can alter a timer (122) controlling the duration during which the display 102 is in the operational mode so that the user can gaze upon the cute picture of Buster for long periods of time without continually interacting with the display 102 or other user interface (110).

Figure 5:
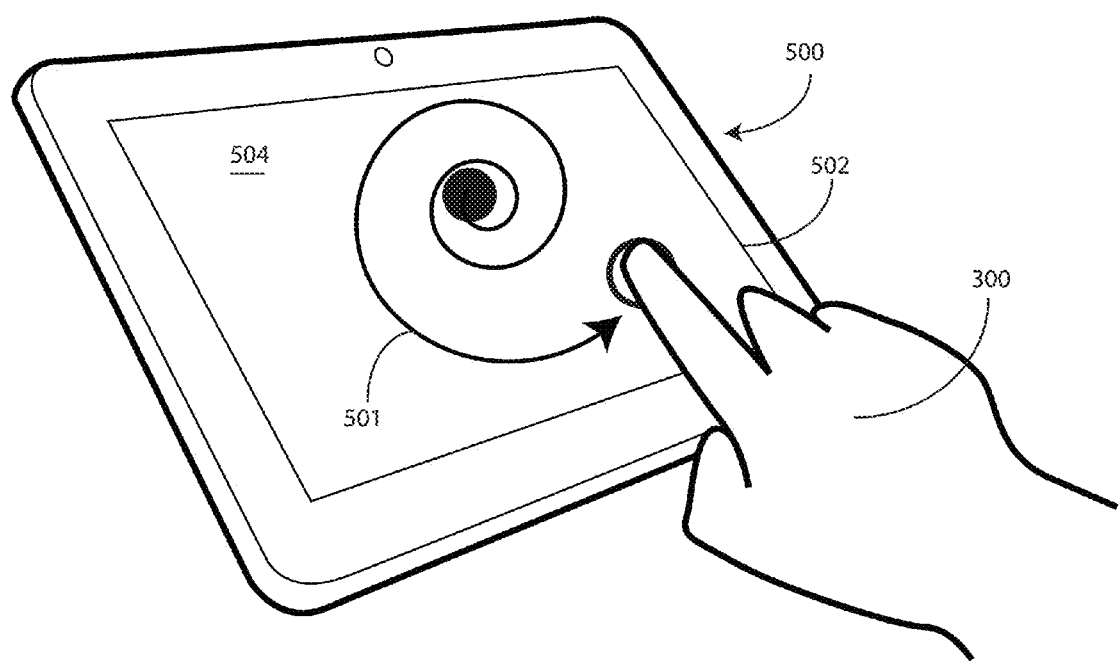
FIG. 5 illustrates one or more explanatory method steps in accordance with one or more embodiments of the disclosure.

Turning now to FIG. 5, illustrated therein is another example of touch input that can be used to extend a duration during which the display 502 of an electronic device 500 is active. The electronic device 500 of FIG. 5 is a tablet computer. In FIG. 5, the user 300 is making a two-dimensional, single-finger gesture 501 along a surface 504 of the display 502, which is touch sensitive in this embodiment. In this illustrative embodiment, the user 300 is making a swirling motion as the two-dimensional, single-finger gesture 501. The swirling motion works well to extend the duration during which the display 502 is active because it is a gesture that is generally not used with general operation of the electronic device 500.

Figure 6:
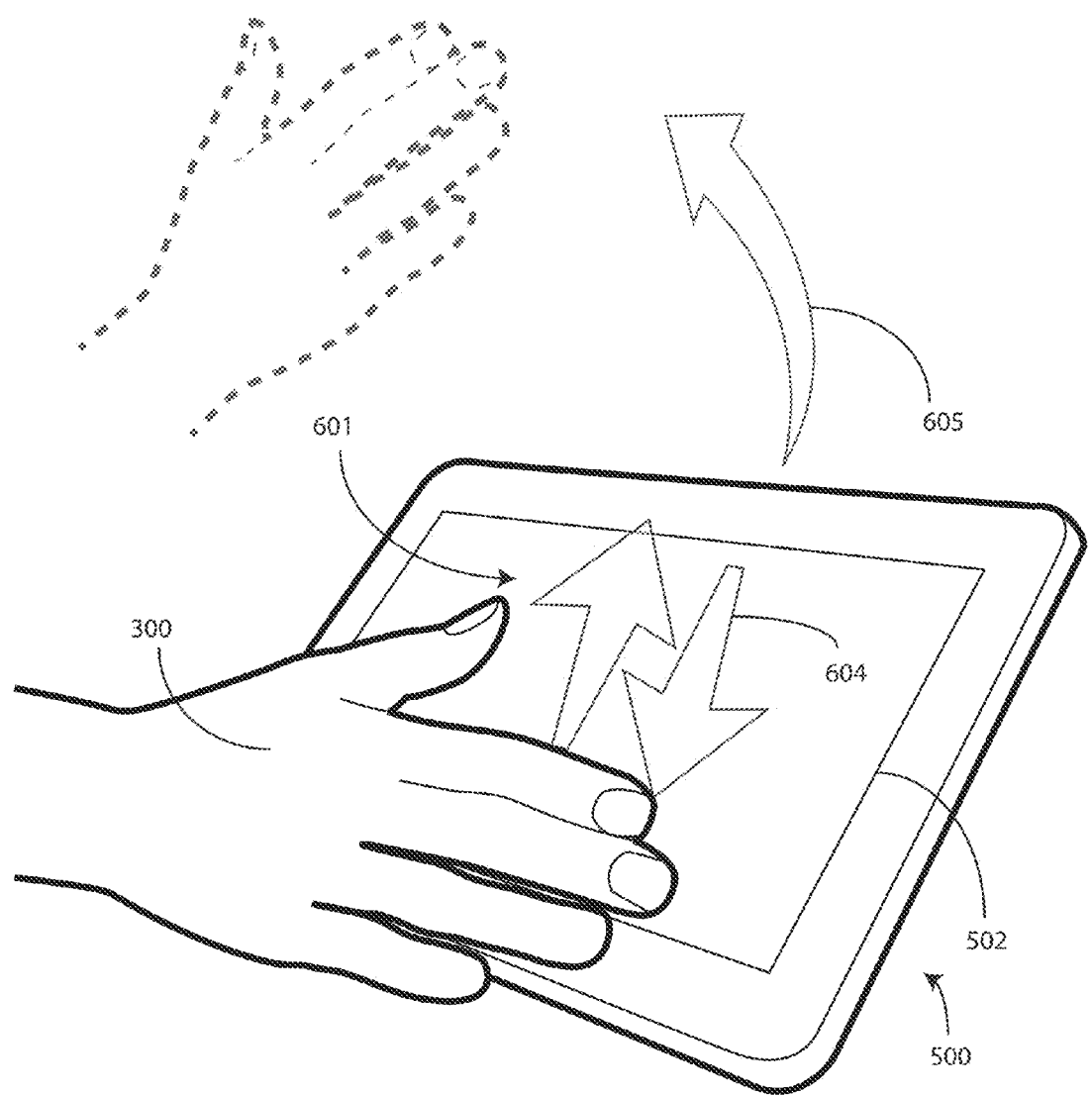
FIG. 6 illustrates one or more explanatory method steps in accordance with one or more embodiments of the disclosure.

Turning now to FIG. 6, illustrated therein is an open-air gesture 601 that can be used to extend the duration during which the display 502 of the electronic device 500 is active. In FIG. 6, the user 300 is waving a hand a few inches above the display 502 to create the open-air gesture 601. A user interface includes a gesture detector and is capable of detecting open-air gestures 601 within about five inches of the electronic device 500. Accordingly, by waving the hand back and forth, the user 300 is able to extend the duration during which the display 502 is active. In one embodiment, the open-air gesture 601 at least doubles a predetermined default time out duration.

It should be noted that the movements 604 of the open-air gesture 601 can occur in two dimensions about the electronic device 500 in one embodiment. In another embodiment, the movements 604 of the open-air gesture 601 can occur in three dimensions about the electronic device 500. Where the predefined gesture comprises a three-dimensional input occurring about the electronic device 500, a wider number of gestures become capable. Illustrating by way of a simple example, a three-dimensional input could include the waving, i.e., the movements 604 of the open-air gesture 601, followed by an upward rise 605 to provide motion in a third dimension. Other three-dimensional inputs will be obvious to those of ordinary skill in the art having the benefit of this disclosure.

Figure 7:
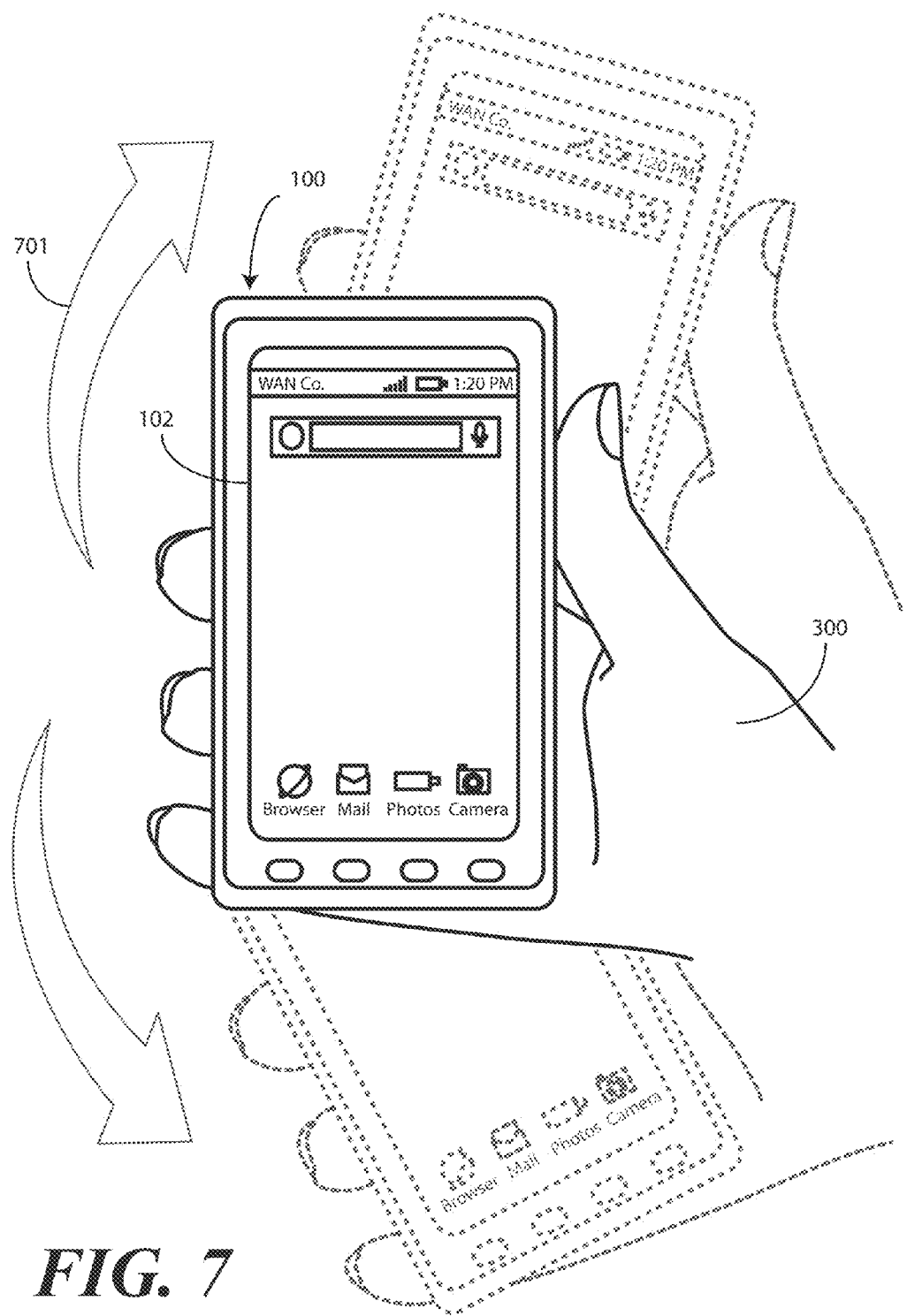
FIG. 7 illustrates one or more explanatory method steps in accordance with one or more embodiments of the disclosure.

Turning to FIG. 7, the user 300 is delivering a predefined gesture input 701 to the electronic device 100 by shaking it. An accelerometer or other motion detector detects this movement of the electronic device 100 and identifies this movement as a predefined gesture input 701 to control a duration during which the display 102 is active as described above. Note that while the predefined gesture input 701 of FIG. 7 is occurring in three dimensions, it could alternatively occur in two dimensions, such as where the user 300 only shook the electronic device 100 in two dimensions along an axis.

Figure 8:
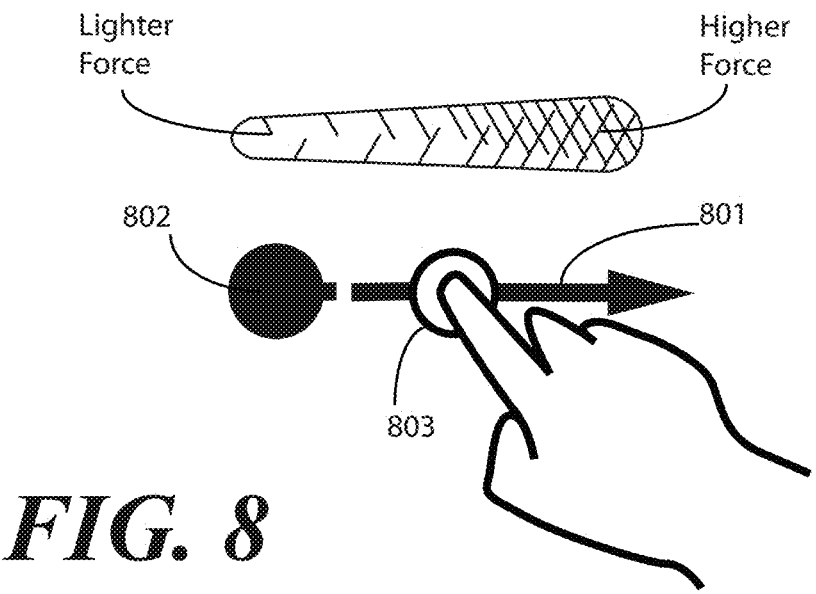
FIG. 8 illustrates one explanatory gesture in accordance with one or more embodiments of the disclosure.
Figure 9:
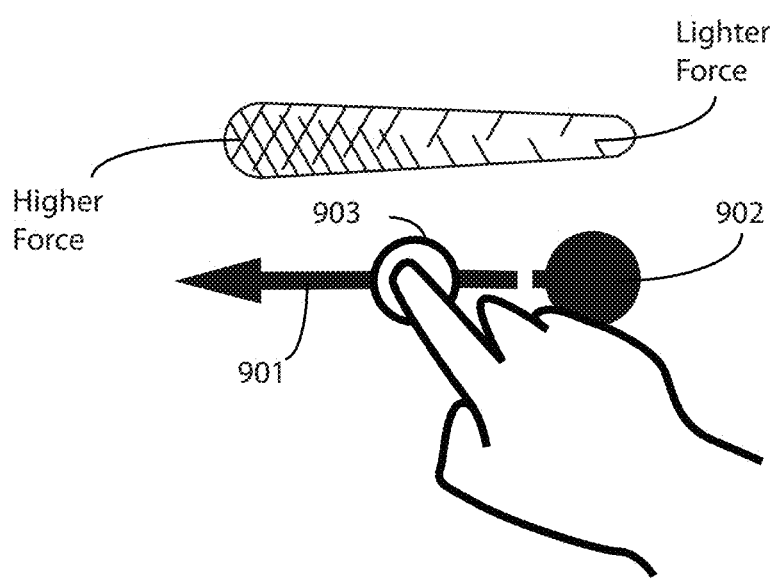
FIG. 9 illustrates another explanatory gesture in accordance with one or more embodiments of the disclosure.

Turning to FIGS. 8 and 9, illustrated therein are predefined gesture inputs that include gesture characteristics. Advantageously, the characteristics can define new movements. Accordingly, a single finger swipe with a constant pressure, for example, can correspond to a scrolling motion, while another single finger swipe with a pressure applied in accordance with a predefined gesture characteristic, can be used to control how long a display is operative prior to timing out.

Beginning with FIG. 8, the user 300 is making a single-finger gesture input 801 to the right. However, this single-finger gesture input 801 is being made in accordance with a predefined gesture characteristic. In this embodiment, the single-finger gesture input 801 begins 802 with a light application of force and ends 803 with a heavier application of force. Control circuits in an electronic device distinguish this single-finger gesture input 801 from a generic scrolling input by identifying the predefined gesture characteristic, which is applied force or pressure in this embodiment. Accordingly, the control circuits can alter the amount of time a display is active prior to turning out. In one embodiment, the duration is a function of the predefined gesture characteristic.

In one or more embodiments, the user 300 can cancel the duration extension by making a different predefined gesture input. One example is shown in FIG. 9. In FIG. 9, the user 300 is making a predefined sliding gesture 901 to the left. Since the single-finger gesture input (801) of FIG. 8 was to the right to extend the duration during which the display was active, the predefined sliding gesture 901 of FIG. 9 can cancel or reduce that extension. In one embodiment for example, a predefined sliding gesture 901 to the left can cancel the extension of the duration and return it to a predetermined default value. In another embodiment, however, the predefined sliding gesture 901 of FIG. 9 can reduce the extension occurring in FIG. 8. For example, the predefined sliding gesture 901 can begin 902 with a light application of force and end 903 with a heavier application of force. The reduction in the extension occurring at FIG. 8 can be proportional to the end force, or alternatively to the difference in force application between beginning and end. Advantageously, the user 300 can employ the gesture inputs of FIGS. 8 and 9 as a pseudo "volume control" to selectively adjust how long the display will be active before timing out.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a touch-sensitive display; and
one or more processors operable to:
set a duration of a timer to a predefined value, the timer being configured to control an amount of time in which the touch-sensitive display is in an operational mode;
receive an indication of a first predefined gesture input detected along a surface of the touch-sensitive display;
responsive to receiving the indication of the first predefined gesture input, reset the duration of the timer to a second value that is different from the predefined value, wherein the second value is based at least in part on an amount of pressure applied at the surface of the touch-sensitive display by the first predefined gesture input;
after resetting the duration of the timer to the second value, receive an indication of a second predefined gesture input that is different from the first predefined gesture input; and
responsive to receiving the indication of the second predefined gesture input, reset the duration of the timer to a third value that is different from the predefined value and the second value, wherein the second value is greater than each of the predefined value and the third value, and wherein the third value is greater than the predefined value.

2. The electronic device of claim 1, wherein at least one of the first predefined gesture input or the second predefined gesture input comprises a two-finger swipe gesture.

3. The electronic device of claim 1, wherein the second value is further based at least in part on a duration of the first predefined gesture input applied along the surface of the touch-sensitive display.

4. The electronic device of claim 1, wherein the one or more processors are further operable to cause the touch-sensitive display to enter a low-power or sleep mode upon expiration of the timer.

5. The electronic device of claim 1, wherein the one or more processors are further operable to reset the duration of the timer to the predefined value upon expiration of the timer.

6. The electronic device of claim 1, wherein the one or more processors are further operable to:
receive an indication of a deactivation of the touch-sensitive display; and
responsive to receiving the indication of the deactivation, reset the duration of the timer to the predefined value.

7. The electronic device of claim 1, wherein the amount of pressure applied at the surface of the touch-sensitive display by the first predefined gesture input comprises an amount of pressure applied at the surface of the touch-sensitive display at a conclusion of the first predefined gesture input.

8. The electronic device of claim 1, wherein the amount of pressure applied at the surface of the touch-sensitive display by the first predefined gesture input comprises a difference between a first amount of pressure applied at the surface of the touch-sensitive display by the first predefined gesture at a first time and a second amount of pressure applied at the surface of the touch-sensitive display by the first predefined gesture input at a second time.

9. A method, comprising:
activating, by one or more processors, a touch-sensitive display of an electronic device;
setting, by the one or more processors, a duration of a timer to a predefined value, the timer being configured to control an amount of time in which the touch-sensitive display is in an operational mode;
receiving, by the one or more processors, an indication of a first predefined gesture input detected along a surface of the touch-sensitive display;
responsive to receiving the indication of the first predefined gesture input, resetting, by the one or more processors, the duration of the timer to a second value that is different from the predefined value, wherein the second value is based at least in part on an amount of pressure applied at the surface of the touch-sensitive display by the first predefined gesture input;
after resetting the duration of the timer to the second value, receiving, by the one or more processors, an indication of a second predefined gesture input that is different from the first predefined gesture input; and
responsive to receiving the indication of the second predefined gesture input, resetting, by the one or more processors, the duration of the timer to a third value that is different from the predefined value and the second value, wherein the second value is greater than each of the predefined value and the third value, and wherein the third value is greater than the predefined value.

10. The method of claim 9, further comprising deactivating, by the one or more processors, the touch-sensitive display upon expiration of the timer.

11. The method of claim 9, wherein the second value is at least twice the predefined value.

12. The method of claim 9, further comprising:
responsive to receiving an indication of a user input to deactivate the touch-sensitive display, resetting, by the one or more processors, the duration of the timer to the predefined value.

13. The method of claim 9, wherein the amount of pressure applied at the surface of the touch-sensitive display by the first predefined gestures input comprises an amount of pressure applied at the surface of the touch-sensitive display at a conclusion of the first predefined gesture input.

14. The method of claim 9, wherein the amount of pressure applied at the surface of the touch-sensitive display by the first predefined gesture input comprises a difference between a first amount of pressure applied at the surface of the touch-sensitive display by the first predefined gesture at a first time and a second amount of pressure applied at the surface of the touch-sensitive display by the first predefined gesture input at a second time.

* * * * *